UNITED STATES PATENT OFFICE.

ROBERT GANS, OF PANKOW, NEAR BERLIN, GERMANY, ASSIGNOR TO J. D. RIEDEL, AKTIENGESELLSCHAFT, OF BERLIN, GERMANY, A CORPORATION OF GERMANY.

HYDRATED ALUMINO-SILICATES, OR ARTIFICIAL ZEOLITES, AND PROCESS OF PRODUCING SAME.

13,688. Specification of Reissued Letters Patent. Reissued Feb. 17, 1914.

No Drawing. Original No. 943,535, dated December 14, 1909, Serial No. 357,997. Application for reissue filed October 13, 1911. Serial No. 654,551.

*To all whom it may concern:*

Be it known that I, Dr. ROBERT GANS, a subject of the German Emperor, residing at Pankow, near Berlin, Germany, manufacturing chemist, have invented certain new and useful Hydrated Alumino-Silicates, or Artificial Zeolites, and Process of Producing Same, of which the following is a specification.

Compounds resembling zeolites have been produced by fusing together an alkali or alkali-metal-carbonate and aluminium-silicate. The compounds are of an amorphous pasty nature and form with water gelatinous liquids, while yielding alkali-silicate and alkali-alumino-silicate. Owing to these two properties they are unsuitable for industrial purposes, especially also as they are almost impermeable.

Hydrated alumino-silicates, which contain 2, 3, 4, 6 or more molecules of silicic acid to 1 molecule of alumina and 1 molecule of soda (sodium oxid) and are free from the said faults, are obtained by adding to the melts of alumina-silicates with alkali or alkali-metal-carbonate quartz, in sufficient quantity to insure, that the whole of the alkali metal will combine with the silicic acid and the alumina. In producing melts with alkali-metal-carbonate, this may be recognized by the fact that the molten and cooled mass, when treated with acids, will not yield carbonic acid at all or if at all only in small quantities.

Another criterion showing that the operation has been performed correctly, is that on treating the molten product with water, the zeolites remain behind, not in a pasty or semi-liquid condition, but in a crystal-like or granular condition.

Instead of pure aluminium silicates, minerals containing alumina in the shape of silicates or aluminates or alumina may be fused together with the alkali or alkali metal-carbonates and quartz or minerals rich in quartz. As a matter of course, alkali-silicate may be used instead of alkali or alkali-metal-carbonate for producing the melt. The zeolites thus obtained have a crystal-like or granular form and are therefore highly permeable, that is to say, liquids filter easily, even through a thick layer of these zeolites, they have no tendency to form gelatinous or colloid solutions and are therefore very useful for industrial purposes. They exchange their bases very easily and may be converted into other zeolites by washing them with saline solutions, for example, hard water containing the carbonates and sulfates of lime and magnesia may be used, whereby the zeolites are converted from sodium zeolites into calcium and magnesium zeolites. If the percentage of alkali or alkali-metal-carbonate in the melt is very much reduced nephelin or eolite is produced. These silicates are anhydrous, they have not the capacity for exchange of their bases and are consequently unsuitable for industrial applications.

Among the great number of modifications of the mixture possible for preparing the melt, I will describe two examples. The number is so great, because by varying the quantity of quartz, the contents of alkali may also be varied.

1. The following materials may be mixed together and then fused.

| | |
|---|---|
| Kaolin | 3 parts by weight |
| Quartz | 6 " " " |
| Sodium carbonate | 12 " " " |

The molecular composition of this melt is as follows:

$$1Al_2O_3+10SiO_2+10Na_2O.$$

The melt is subjected to extraction with cold water, thereby obtaining an alumino-silicate in a crystal-like or granular form, which has the following composition:

| | |
|---|---|
| $SiO_2=46.0$ | per cent. |
| $Al_2O_3=22.0$ | " " |
| $Na_2O=13.6$ | " " |
| $H_2O=18.4$ | " " |

The extraction of the melt with water has the effect of removing chiefly alkali-silicates, such as correspond to the formulas:—

$$Na_2SiO_3(K_2SiO_3) \text{ to } Na_4SiO_4(K_4SiO_4)$$

and the extraction with water is continued until no soluble substances remain.

2. Or the following materials may be melted after mixing together:

| | |
|---|---|
| Alumina | 2 parts by weight |
| Quartz | 12 " " " |
| Sodium carbonate | 20 " " " |

This melt has the same molecular composition and, on being extracted with cold water until no soluble substances remain, it yields a product equal to that obtained from the melt according to the first example.

The products obtained by the present process are suitable chiefly for the purification or softening of water, also for the treatment of saccharine juices and molasses, to remove the potash and soda which cause the formation of molasses, in order that larger quantities of sugar may crystallize out of the liquid.

The purification or the softening of water may be effected in a simple manner by filtering the water through a layer of zeolites or alumino-silicate containing sodium.

On the saturation of the zeolites with the bases of the salts contained in the hard water, the zeolites may be reconverted or regenerated by filtering through them a solution of a sodium salt, by which a sodium alumino-silicate is again produced.

The chemical reaction may take place, for example, in the manner indicated by the following equation:

$$2SiO_2Al_2O_3Na_2O+CaH_2(CO_3)_2= 2SiO_2Al_2O_3CaO+2NaHCO_3.$$

Molasses and saccharine juices containing potash are filtered through alumino-silicates containing calcium, in which case the chemical reaction taking place may be expressed for example, by the following equation:

$$2SiO_2.Al_2O_3CaO+K_2O= 2SiO_2.Al_2O_3.K_2O+CaO.$$

What I claim as my invention and desire to secure by Letters Patent is:—

1. The herein described process for the manufacture of zeolites in a crystal-like or granular form, which consists in melting together one part of alumina by weight with from seven to ten parts by weight of an alkali with the addition of as much quartz as may be necessary to insure that the whole of the alkali metal will combine with the silicic acid and the alumina, and subsequently extracting the melt with water.

2. The herein described process for the manufacture of zeolites in a crystal-like or granular form, which consists in fusing together sufficient quantity of alumina-silicate to furnish one part by weight of alumina with from seven to ten parts by weight of an alkali with the addition of the quantity of quartz necessary for converting the whole of the alkali metal into compounds of silica and alumina, and subsequently extracting the melt with water.

3. The herein described process for the manufacture of zeolites in a crystal-like or granular form, which consists in melting together one part by weight of alumina with from seven to ten parts by weight of an alkali-carbonate with the addition of as much quartz as may be necessary to insure that the whole of the alkali metal will combine with the silicic acid and the alumina, and subsequently extracting the melt with water.

4. The herein described process for the manufacture of zeolites in a crystal-like or granular form, which consists in fusing together sufficient quantity of alumina-silicate to furnish one part by weight of alumina with from seven to ten parts by weight of an alkali-carbonate with the addition of the quantity of quartz necessary for converting the whole of the alkali metal into compounds of silica and alumina and subsequently extracting the melt with water.

5. A new article of manufacture, fused and hydrated alumino-silicates in a crystal-like or granular form, substantially as described.

In testimony whereof I have hereunto signed my name to this specification in the presence of two subscribing witnesses.

DR. ROBERT GANS.

Witnesses:
CORNELIUS MASSACIU,
GEORG SEITTGE.